US012741591B2

(12) United States Patent
Shigematsu

(10) Patent No.: US 12,741,591 B2
(45) Date of Patent: Sep. 22, 2026

(54) VEHICLE-MOUNTED CAMERA AND METHOD OF MANUFACTURING THE SAME

(71) Applicant: SONY SEMICONDUCTOR SOLUTIONS CORPORATION, Kanagawa (JP)

(72) Inventor: Kazuma Shigematsu, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 334 days.

(21) Appl. No.: 17/628,521

(22) PCT Filed: Jul. 22, 2020

(86) PCT No.: PCT/JP2020/028365
§ 371 (c)(1),
(2) Date: Jan. 19, 2022

(87) PCT Pub. No.: WO2021/020256
PCT Pub. Date: Feb. 4, 2021

(65) Prior Publication Data
US 2022/0274528 A1 Sep. 1, 2022

(30) Foreign Application Priority Data
Aug. 1, 2019 (JP) ................................ 2019-142441

(51) Int. Cl.
*B60R 1/20* (2022.01)
*H04N 23/52* (2023.01)
*H04N 23/57* (2023.01)

(52) U.S. Cl.
CPC ............... *B60R 1/20* (2022.01); *H04N 23/52* (2023.01); *H04N 23/57* (2023.01); *B60R 2300/10* (2013.01)

(58) Field of Classification Search
CPC ........ H04N 23/52; H04N 23/57; H04N 23/54; H04N 23/00; G03B 15/00; G03B 17/02; B60R 2300/10; B60R 1/20; G02B 7/02
See application file for complete search history.

(56) References Cited

U.S. PATENT DOCUMENTS

2008/0237768 A1* 10/2008 Yajima .................... H10F 77/50 257/434
2011/0037893 A1* 2/2011 Okada .................... H04N 23/57 348/374

(Continued)

FOREIGN PATENT DOCUMENTS

CN 107155050 A 9/2017
CN 108292081 A 7/2018

(Continued)

OTHER PUBLICATIONS

International Search Report and Written Opinion of PCT Application No. PCT/JP2020/028365, issued on Oct. 20, 2020, 11 pages of ISRWO.

*Primary Examiner* — Twyler L Haskins
*Assistant Examiner* — John H Morehead, III
(74) *Attorney, Agent, or Firm* — CHIP LAW GROUP

(57) ABSTRACT

This vehicle-mounted camera includes a substrate on which an imaging device is mounted, a holder that holds a lens unit, and a bonding portion that is made of an adhesive having photo-curing property and bonds the substrate and the holder to each other in a direction intersecting an imaging surface of the imaging device.

8 Claims, 19 Drawing Sheets

(56) References Cited

U.S. PATENT DOCUMENTS

| | | | | |
|---|---|---|---|---|
| 2011/0199485 | A1* | 8/2011 | Nakamura | G02B 13/001 348/148 |
| 2012/0175508 | A1 | 7/2012 | Kashima et al. | |
| 2012/0229701 | A1* | 9/2012 | Pavithran | H04N 23/51 348/374 |
| 2013/0075850 | A1* | 3/2013 | Patterson | H10F 39/804 257/432 |
| 2016/0062110 | A1* | 3/2016 | Kashima | G02B 7/022 359/513 |
| 2016/0323485 | A1 | 11/2016 | Shimizu | |
| 2017/0257532 | A1* | 9/2017 | Takama | H04N 23/55 |
| 2017/0257537 | A1 | 9/2017 | Masui et al. | |
| 2017/0339323 | A1* | 11/2017 | Drotleff | H04N 23/57 |
| 2018/0166485 | A1* | 6/2018 | Park | H10F 39/12 |
| 2018/0167538 | A1* | 6/2018 | Wang | H04N 23/54 |
| 2018/0231872 | A1 | 8/2018 | Tahara et al. | |
| 2019/0075223 | A1* | 3/2019 | Chen | G02B 7/025 |
| 2019/0079261 | A1* | 3/2019 | Wang | G02B 7/023 |
| 2019/0267418 | A1* | 8/2019 | Momiuchi | H10F 39/804 |
| 2019/0349516 | A1* | 11/2019 | Lee | H04N 25/00 |
| 2019/0353986 | A1* | 11/2019 | Lai | H10F 39/809 |
| 2020/0363601 | A1* | 11/2020 | Abe | H10F 39/806 |

FOREIGN PATENT DOCUMENTS

| | | | | |
|---|---|---|---|---|
| DE | 102017203489 | A | 9/2017 | |
| JP | 2002-314857 | A | 10/2002 | |
| JP | 2004080774 | A | 3/2004 | |
| JP | 2010-171862 | A | 8/2010 | |
| JP | 2012-069851 | A | 4/2012 | |
| JP | 2012-147203 | A | 8/2012 | |
| JP | 6172029 | A | 8/2017 | |
| JP | 2017-158097 | A | 9/2017 | |
| JP | 2017-181769 | A | 10/2017 | |
| WO | 2017/169059 | A1 | 10/2017 | |
| WO | WO-2019044509 | A1 * | 3/2019 | H04N 23/55 |

* cited by examiner

VEHICLE-MOUNTED CAMERA AND METHOD OF MANUFACTURING THE SAME

CROSS REFERENCE TO RELATED APPLICATIONS

This application is a U.S. National Phase of International Patent Application No. PCT/JP2020/028365 filed on Jul. 22, 2020, which claims priority benefit of Japanese Patent Application No. JP 2019-142441 filed in the Japan Patent Office on Aug. 1, 2019. Each of the above-referenced applications is hereby incorporated herein by reference in its entirety.

TECHNICAL FIELD

The present technology relates to a vehicle-mounted camera for front sensing or the like mounted on a vehicle, and to a method of manufacturing the same.

BACKGROUND ART

Conventionally, in manufacturing a vehicle-mounted camera, in order to fix a holder for holding a lens to a substrate on which an imaging device is mounted, the following method is generally employed: the holder is mounted on the surface of the substrate via an ultraviolet (UV)-curable adhesive, the spatial relationship between the lens and the imaging device is adjusted, the adhesive is then irradiated with UV light to be cured, and then, if necessary, the bonding portion is fully cured in a thermostatic chamber or the like. Here, for the spatial adjustment of the lens and the imaging device, a method using 6-axis alignment has become mainstream with an increase in the resolution of the imaging device and a reduction in the cell size.

However, since the adhesive shrinks at a percentage unique to each substance in the UV-curing and thermosetting processes, there are many cases where the adhesive is displaced from the alignment position after curing. Further, due to the difference in the coefficient of linear expansion between the members to be bonded, there have occurred residual stress in the bonded portion after thermosetting, deformation in the bonded portion and its peripheral members over time, and degradation of resolution due to focus deviation over time.

As a structure that is hardly affected by the curing shrinkage amount of the adhesive, for example, as in Patent Literature 1, the following system is known: the outer peripheral surface of the lens barrel and the inner peripheral surface of the holder (the inner wall surface of the holder barrel portion) are fixed with an adhesive. However, since the bonding surfaces are coaxial surfaces, this method is unsuitable for tilt adjustment in the pitch/yaw directions.

CITATION LIST

Patent Literature

Patent Literature 1: Japanese Patent No. 6172029

DISCLOSURE OF INVENTION

Technical Problem

As described above, in manufacturing a vehicle-mounted camera having a structure in which a holder for holding a lens is fixed to a substrate on which an imaging device is mounted via an adhesive, the measures to reduce the influence of curing shrinkage of the adhesive, such as displacement of the lens and the imaging device after 6-axis alignment, have been insufficient.

In view of the above circumstances, it is an object of the present technology to provide a vehicle-mounted camera and a method of manufacturing the same that are capable of suppressing a displacement of an imaging device and a lens from an alignment position due to curing shrinkage of an adhesive, and obtaining good focusing accuracy.

Solution to Problem

In order to achieve the above object, a vehicle-mounted camera according to an embodiment of the present disclosure includes: a substrate on which an imaging device is mounted; a holder that holds a lens unit; and a bonding portion that is made of an adhesive having photo-curing property and bonds the substrate and the holder to each other on a surface intersecting an imaging surface of the imaging device.

In the vehicle-mounted camera according to the present disclosure, the adhesive may be a hybrid adhesive having thermosetting property in addition to the photo-curing property.

In the vehicle-mounted camera according to the present disclosure, the substrate may have a side surface perpendicular to the imaging surface, the holder may have a substrate-side-surface-facing surface that faces the side surface of the substrate, and the bonding portion may be configured to bond the side surface of the substrate and the substrate-side-surface-facing surface to each other.

In the vehicle-mounted camera according to the present disclosure, the holder may further include a bottom forming surface that forms a bottom surface of a space for stopping the adhesive before subjected to photo-curing between the side surface of the substrate and the substrate-side-surface-facing surface, and the bonding portion may be configured to bond the side surface of the substrate to the substrate-side-surface-facing surface and the bottom forming surface.

In the vehicle-mounted camera according to the present disclosure, the holder may include a seating surface for receiving a back surface of a mounting surface for the imaging device of the substrate and positioning the substrate such that the space is formed before aligning the imaging surface of the imaging device and the lens unit.

In the vehicle-mounted camera according to the present disclosure, the bonding portion may be provided to correspond to an entire circumference of the substrate.

The vehicle-mounted camera according to the present disclosure may further include a dust-proof cushion disposed between the holder and a mounting surface for the imaging device of the substrate to correspond to an entire circumference of the substrate.

In the vehicle-mounted camera according to the present disclosure, the bonding portion may include a first bonding portion made of the adhesive having the photo-curing property or a hybrid adhesive having thermosetting property in addition to the photo-curing property, and a second bonding portion made of a thermosetting adhesive.

In the vehicle-mounted camera according to the present disclosure, the substrate may further include a through-hole with a filter function, the through-hole ventilating a space around the imaging surface of the imaging device on the substrate and outside of the space.

A method of manufacturing a vehicle-mounted camera according to the present disclosure include: applying an adhesive having photo-curing property between a side surface of a substrate on which an imaging device is mounted and a substrate-side-surface-facing surface of the holder that holds the lens unit, the substrate-side-surface-facing surface facing the side surface; performing 6-axis alignment of the imaging device and the lens unit; and bonding the side surface of the substrate and the substrate-side-surface-facing surface to each other by irradiating the adhesive with light to cure the adhesive after the 6-axis alignment.

With the vehicle-mounted camera and the method of manufacturing the same according to the present disclosure, since the substrate on which the imaging device is mounted and the holder holding the lens unit are bonded to each other by the bonding portion made of the adhesive having the photo-curing property on the surface intersecting the imaging surface of the imaging device, it is possible to suppress the displacement of the 6-axis alignment position due to the curing shrinkage of the adhesive, and to obtain good focusing accuracy.

MODE(S) FOR CARRYING OUT THE INVENTION

Hereinafter, embodiments of the present technology will be described with reference to the drawings.

First, the configuration of a typical vehicle-mounted camera and its problems will be described, and subsequently, embodiments of a vehicle-mounted camera according to the present technology will be described.

[Configuration of Typical Vehicle-Mounted Camera and its Problems]

Figure 1:
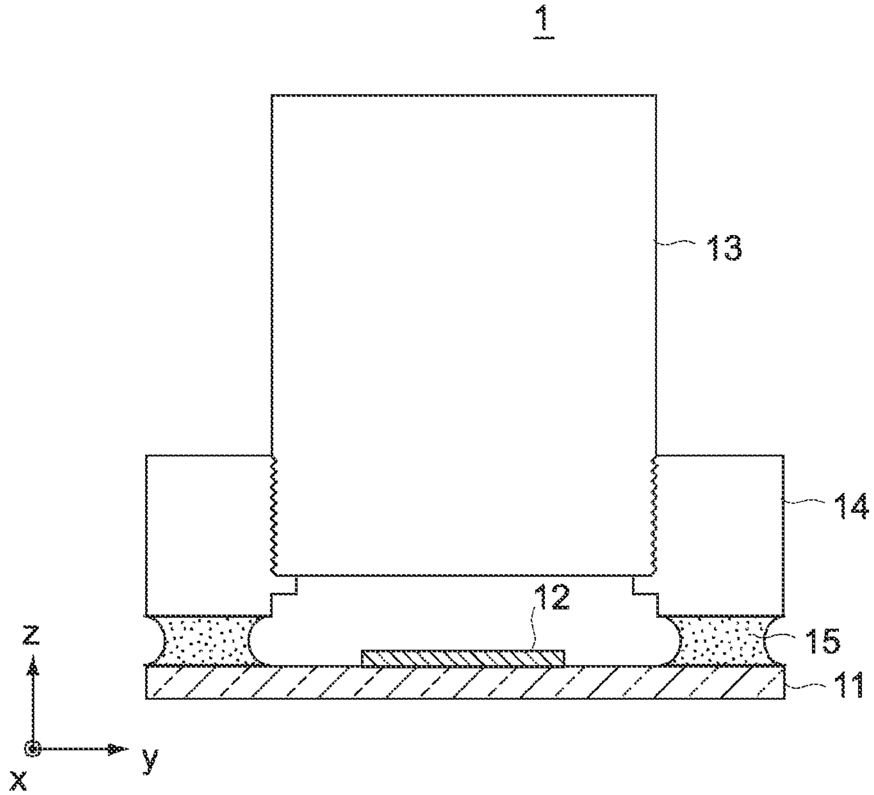
FIG. 1 is a cross-sectional view showing a configuration of a typical vehicle-mounted camera 1.

FIG. 1 is a cross-sectional view showing a configuration of a typical vehicle-mounted camera 1.

As shown in the figure, this typical vehicle-mounted camera 1 includes a substrate 11, an imaging device 12 mounted on one surface of the substrate, a lens unit 13, and a holder 14 that holds the lens unit 13. The imaging device 12 such as a CMOS image sensor or a CCD image sensor is mounted on the main surface of the substrate 11. The holder 14 is a metal holder 14 made of, for example, aluminum die-cast that is configured to hold the outer periphery of the lens unit 13. The holder 14 is bonded to the surface of the substrate 11, on which the imaging device is mounted, by a bonding portion 20 made of a UV-curable adhesive or a UV-curable/thermosetting hybrid adhesive.

In the manufacture of the vehicle-mounted camera 1, after the 6-axis alignment of the lens unit 13 and the imaging device 12, a UV-curable adhesive or a UV-curable/thermosetting hybrid adhesive interposed between the substrate 11 and the holder 14 is UV-cured, and then fully cured in a thermostatic chamber or the like as necessary, so that the substrate 11 and the holder 14 are fixed to each other.

However, since the UV-curable adhesive or the UV-curable/thermosetting hybrid adhesive shrinks at a ratio unique to each substance in the UV-curing and thermosetting processes, a displacement from the alignment position occurs after curing, or a deformation occurs due to residual stress generated in the bonding portion 15 and the peripheral portion thereof due to a difference in the thermal expansion coefficients of the respective materials of the substrate 11 and the holder 14. Thus, the resolution may be deteriorated due to focus deviation.

The vehicle-mounted camera according to the present disclosure has the above-mentioned problems as a part of the problems to be solved.

First Embodiment

Next, a vehicle-mounted camera of a first embodiment according to the present disclosure will be described.

Figure 2:
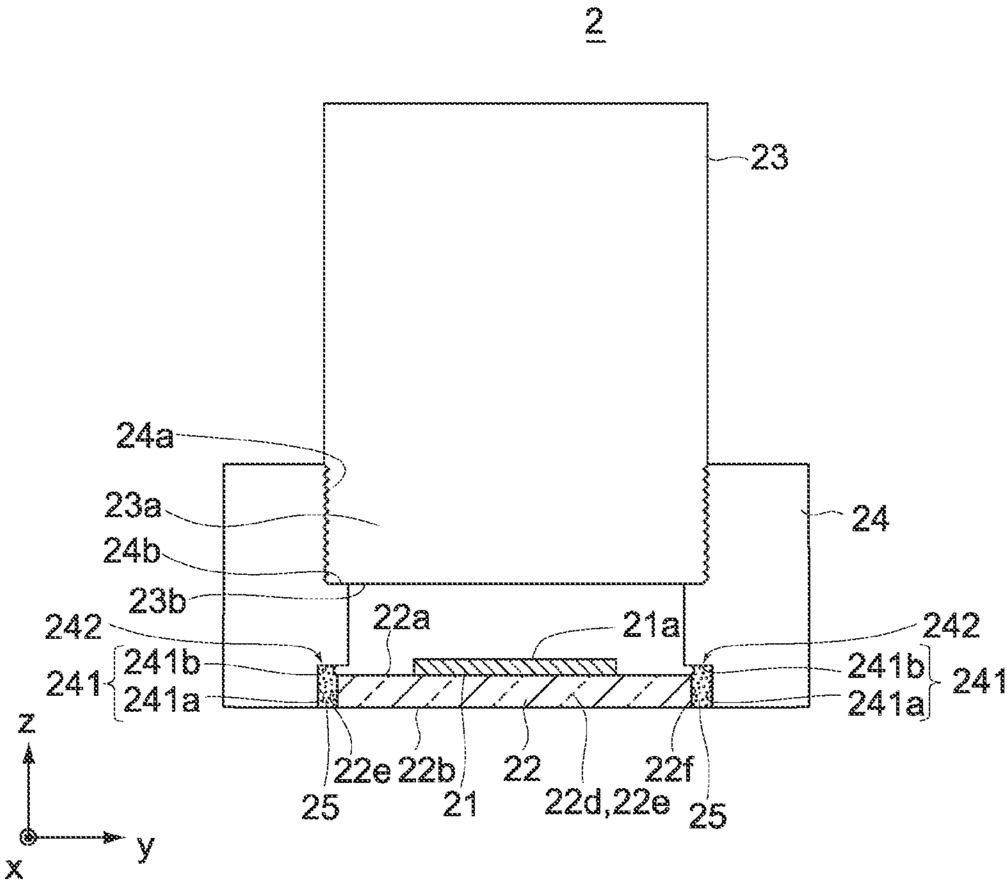
FIG. 2 is a cross-sectional view showing a configuration of a vehicle-mounted camera 2 of a first embodiment according to the present disclosure.

FIG. 2 is a cross-sectional view showing the configuration of a vehicle-mounted camera 2 of the first embodiment according to the present disclosure.

The vehicle-mounted camera 2 of this embodiment includes: a substrate 22 having one main surface on which an imaging device 21 is mounted; a holder 24 that holds a lens unit 23; and a bonding portion 25 that is made of an adhesive having at least photo-curing property and bonds the substrate 22 and the holder 24 to each other on at least a surface intersecting an imaging surface of the imaging device 21.

The imaging device 21 may be, for example, a complementary metal oxide semiconductor (CMOS) image sensor or a charge coupled device (CCD) image sensor.

The lens unit 23 includes a lens barrel portion 23*a* that holds one or more lenses for imaging. A part of the lens barrel portion 23*a* in an optical axis direction is inserted into a lens barrel receiving hole 24*a* of the holder 24, and a part of a distal end surface 23*b* in the optical axis direction of the lens barrel portion 23*a* is received by a lens unit receiver 24*b* protruding to the bottom inner peripheral surface of the lens barrel receiving hole 24*a*, so that the lens unit 23 is held in the holder 24.

The substrate 22 has an imaging device mounting surface (front surface) 22*a*, a back surface 22*b* on the opposite side, which face each other in the z direction (optical axis direction), and four side surfaces 22*c*, 22*d*, 22*e*, and 22*f*. The four side surfaces include the two side surfaces 22*c* and 22*d* facing each other in the x direction and the two side surfaces 22*e* and 22*f* facing each other in the y direction. The four side surfaces intersect the imaging device mounting surface (front surface) 22*a* at 90 degrees or substantially 90 degrees.

The holder 24 is made of aluminum die-cast, for example.

The holder 24 includes the lens barrel receiving hole 24*a*, into which a part of the lens barrel portion 23*a* in the optical axis direction of the lens unit 23 is inserted, and the lens unit receiver 24*b* for receiving a part of the distal end surface 23*b* in the optical axis direction of the lens barrel portion 23*a* inserted into the lens barrel receiving hole 24*a*. The holder 24 is configured to hold the lens unit 23 at a position floated in the optical axis direction from the imaging surface 21*a* of the imaging device 21 on the substrate 22.

Further, the holder 24 includes a holder holding portion 242 having a substrate bonding surface 241 to be bonded to the four side surfaces 22*c*, 22*d*, 22*e*, and 22*f* of the substrate 22 via the bonding portion 25.

Note that the lens unit 23 and the holder 24, which are separate members, may be combined with each other as described above, or the lens unit 23 may be integrally provided with the holder 24.

Figure 3:
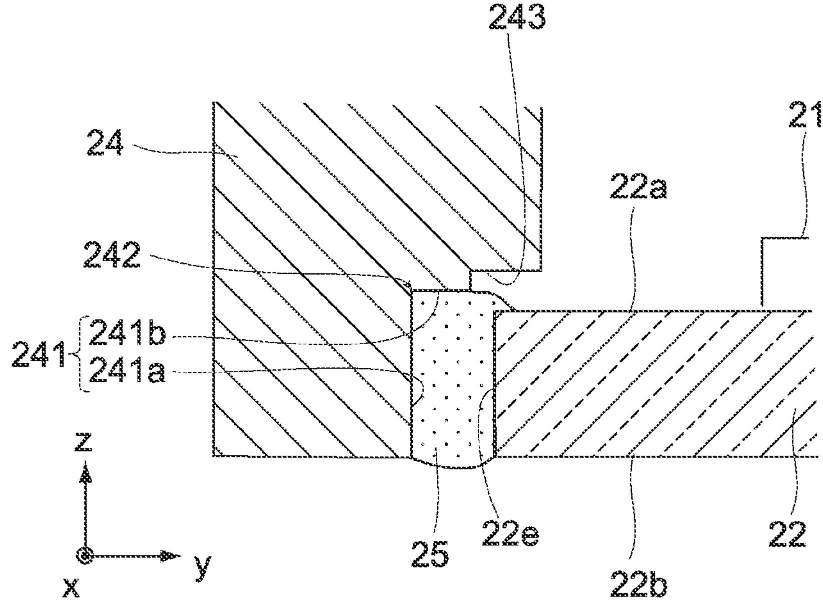
FIG. 3 is an enlarged cross-sectional view showing a bonding structure of a side surface 22*e* of a substrate 22 in a holder holding portion 242 of FIG. 2.

FIG. 3 is an enlarged cross-sectional view showing a bonding portion structure of the side surface 22*e* of the substrate 22 in the holder holding portion 242.

As shown in the figure, the holder holding portion 242 has the substrate bonding surface 241 bonded to the side surface 22*e* of the substrate 22, and a seating surface 243. The substrate bonding surface 241 has a substrate-side-surface-facing surface 241*a* facing the side surface 22*e* of the substrate 22, and a bottom forming surface 241*b* forming a bottom surface of a space for accumulating the adhesive before subjected to curing between the side surface 22*e* of the substrate 22 and the substrate-side-surface-facing surface 241*a*. The seating surface 243 is a surface for receiving the peripheral portion of the imaging device mounting surface 22*a* of the substrate 22 and positioning the substrate 22 when the above-mentioned space is formed.

Here, the distance between the substrate-side-surface-facing surface 241*a* of the holder 24 and the side surface 22*e* of the substrate 22 is set to a necessary minimum value in consideration of various tolerances such as the manufacturing tolerance of the holder 24 and the manufacturing tolerance of the substrate 22. The length of the substrate-side-surface-facing surface 241*a* of the holder 24 in the z direction is equal to or slightly larger than the thickness of the substrate 22. For example, when the thickness of the substrate 22 is 1.6 mm, the length of the substrate-side-surface-facing surface 241*a* in the z direction is appropriately approximately 2.2 mm.

As the adhesive having the photo-curing property, a UV-curable adhesive or a UV-curable/thermosetting hybrid adhesive can be used. As will be described later, the bonding portion 25 may be provided to a part of the outer periphery of the substrate 22, or a part of the bonding portion may be replaced with a high heat-resistance bonding portion made of a thermosetting adhesive, after taking a measure to prevent dust or the like from entering the space surrounding the imaging surface 21*a* of the imaging device 21.

(Manufacturing Method)

Next, a method of manufacturing the vehicle-mounted camera of this embodiment will be described with reference to FIGS. 4 to 7.

Figure 4:
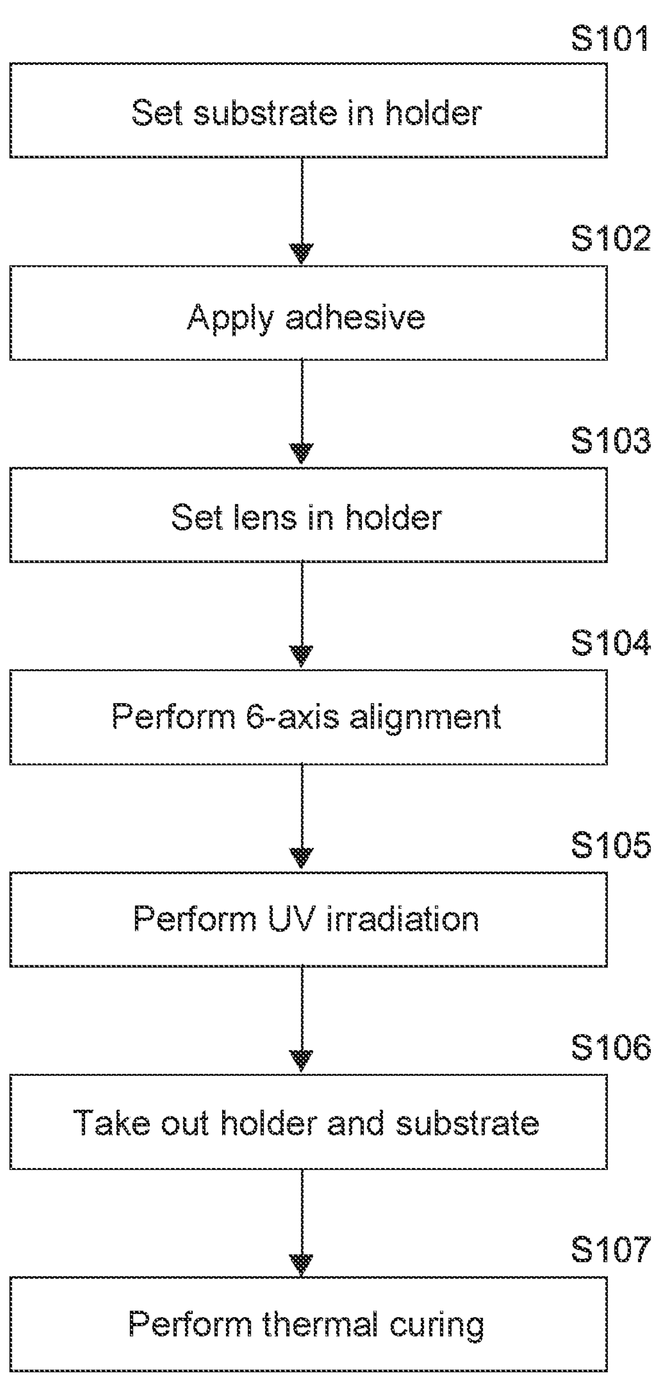
FIG. 4 is a flowchart showing the procedure of a method of manufacturing the vehicle-mounted camera of this embodiment.

FIG. 4 is a flowchart showing the procedure of the method of manufacturing the vehicle-mounted camera of this embodiment.

Figure 5:
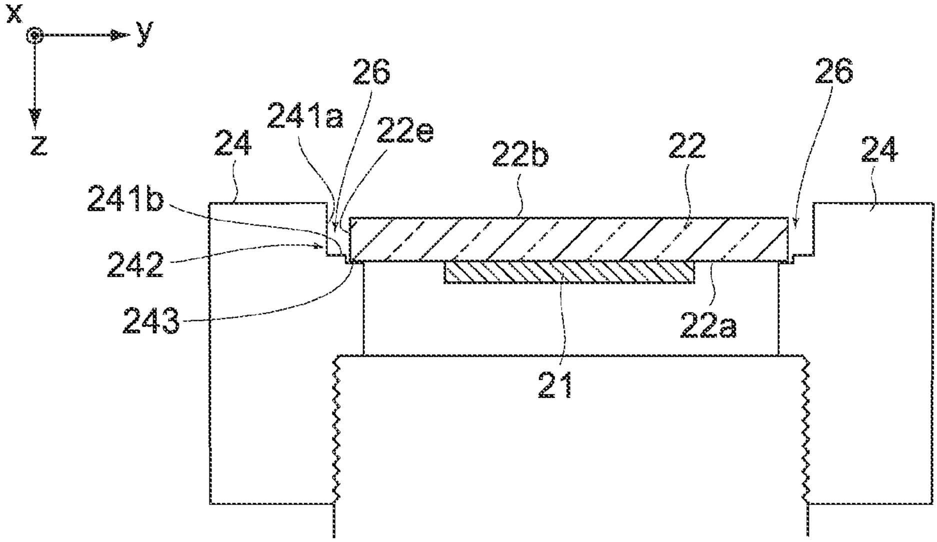
FIG. 5 is a cross-sectional view showing a state of setting the substrate to the holder.

1. As shown in FIG. 5, first, with the holder 24 and the substrate 22 turned upside down from the state of FIG. 1, the substrate 22 is set such that the peripheral portion of the imaging device mounting surface 22*a* of the substrate 22 rests on the seating surface 243 of the holder holding portion 242 of the holder 24 (Step S101). As a result, in the holder holding portion 242 of the holder 24, the above-mentioned space 26 for accumulating an adhesive is formed by the substrate-side-surface-facing surface 241*a* and the bottom forming surface 241*b*, which are the substrate bonding surface 241, and the side surface 22*e* of the substrate 22.

Figure 6:
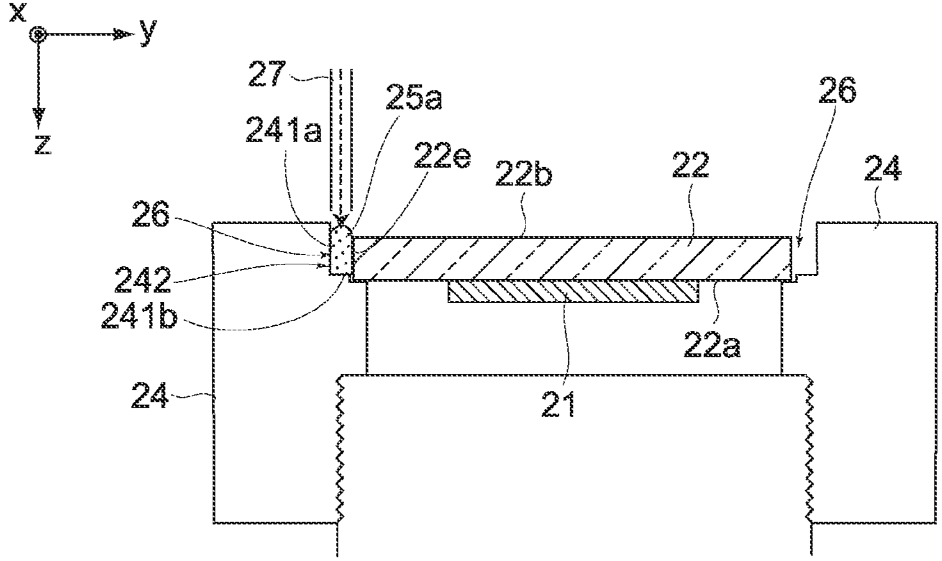
FIG. 6 is a cross-sectional view showing the application of an adhesive.

2. Next, as shown in FIG. 6, an adhesive 25*a* is poured into the space 26 by using an application needle 27 (Step S102). At that time, since the substrate 22 is stably disposed on the seating surface 243 of the holder holding portion 242 of the holder 24, and the bottom surface of the space 26 is closed by the substrate 22 such that the adhesive 25*a* does not leak downward from the space 26, the adhesive 25*a* can be applied satisfactorily and easily.

3. Next, the lens barrel portion 23*a* is inserted into the barrel receiving hole 24*a* of the holder 24, so that the holder 24 is attached to the holder 24 (Step S103). After that, 6-axis alignment of the lens unit 23 attached to the holder 24 and the imaging surface 21*a* of the imaging device 21 mounted on the substrate 22 is performed using an MTF measuring method (Step S104).

4. After the 6-axis alignment is completed, the adhesive 25*a* is UV-cured by irradiating the adhesive 25*a* applied in the space 26 with ultraviolet rays (UV light) (Step 105).

5. Subsequently, the set of the holder 24 and the substrate 22, which are bonded to each other by the UV-cured bonding portion 25, is taken out from the MTF measuring system (Step S106), and the bonding portion 25 is fully cured in a thermostatic chamber or the like (Step S107).

The MTF measuring method is specified in the ISO (International Organization for Standardization) 12233. In the MTF measurement, a chart in which a pattern for MTF measurement is drawn is imaged with a camera that is a measurement object, and the reproducibility of contrast in the pattern of the chart is evaluated.

Figure 7:
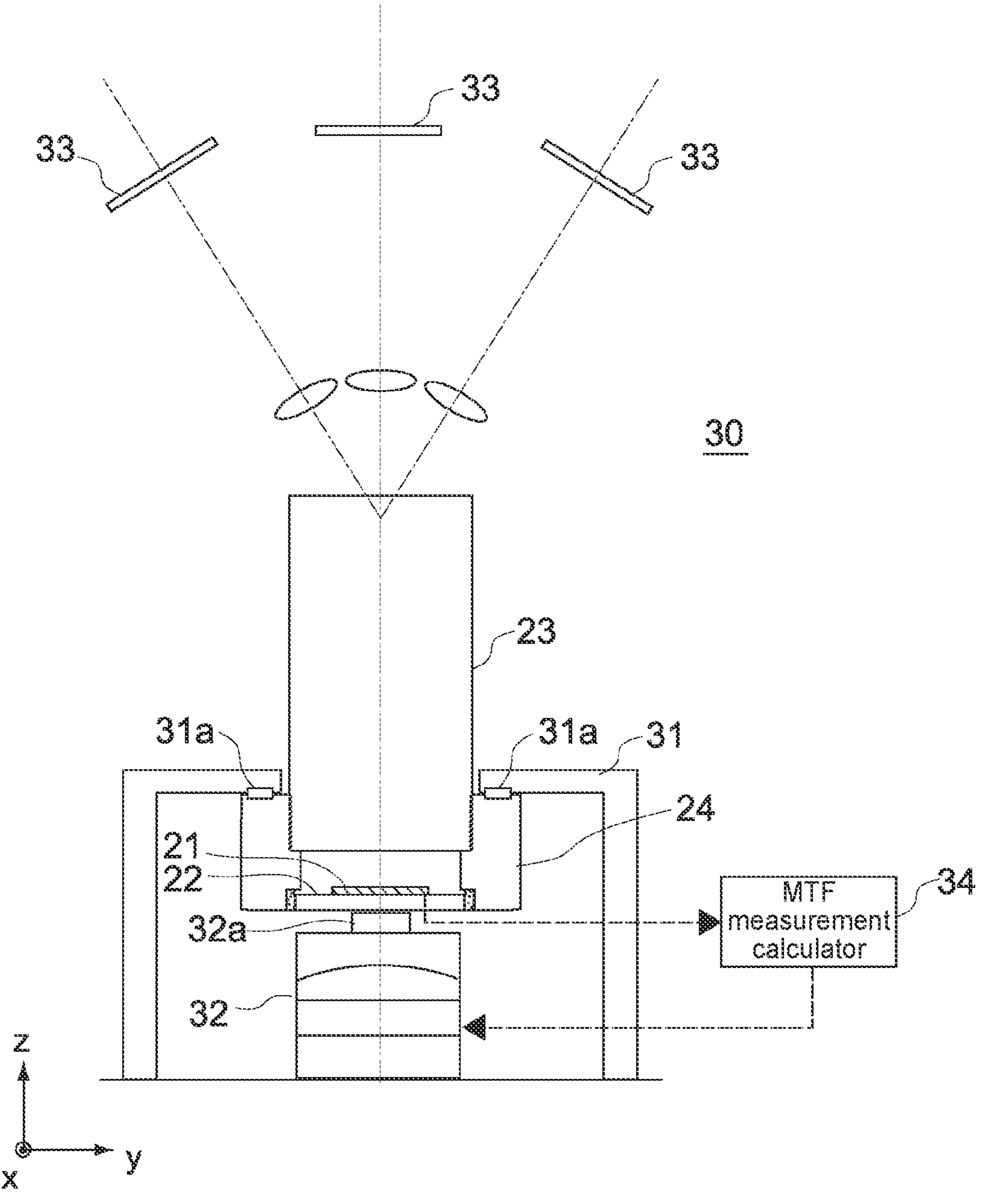
FIG. 7 is a schematic view of an MTF measurement system for 6-axis alignment.

FIG. 7 is a schematic view of an MTF measurement system for 6-axis alignment.

An MTF measurement system 30 for 6-axis alignment includes a support portion 31 that supports the holder 24 using a suction mechanism or mechanical chuck mechanism 31*a*, a 6-axis adjustment stage 32 on which the substrate 22, on which the imaging device 21 is mounted, is to be mounted, MTF measurement charts 33, and an MTF measurement calculator 34. The 6-axis adjustment stage 32 includes a suction unit 32*a* for holding the substrate 22 by suction. The 6-axis adjustment stage 32 is a stage capable of individually adjusting the positions in the three axis directions of xyz, a rotational position θ, an x-axis inclination angle, and an x-axis inclination angle. In such an MTF measurement system, the pattern image of the MTF measurement chart 33 is formed on the imaging surface of the imaging device 21 through the lens unit 23 held in the holder 24. The video signal thus obtained is supplied to the MTF measurement calculator 34. The MTF measurement calculator 34 calculates the evaluation value of the above-mentioned reproducibility of contrast from the supplied image, and controls the 6-axis adjustment stage 32 such that the evaluation value is maximum.

Note that, in the MTF measurement system shown in FIG. 7, the upper and lower directions of the holder 24 and the substrate 22 are opposite to those of FIG. 5 when the adhesive 25*a* is applied.

Figure 8:
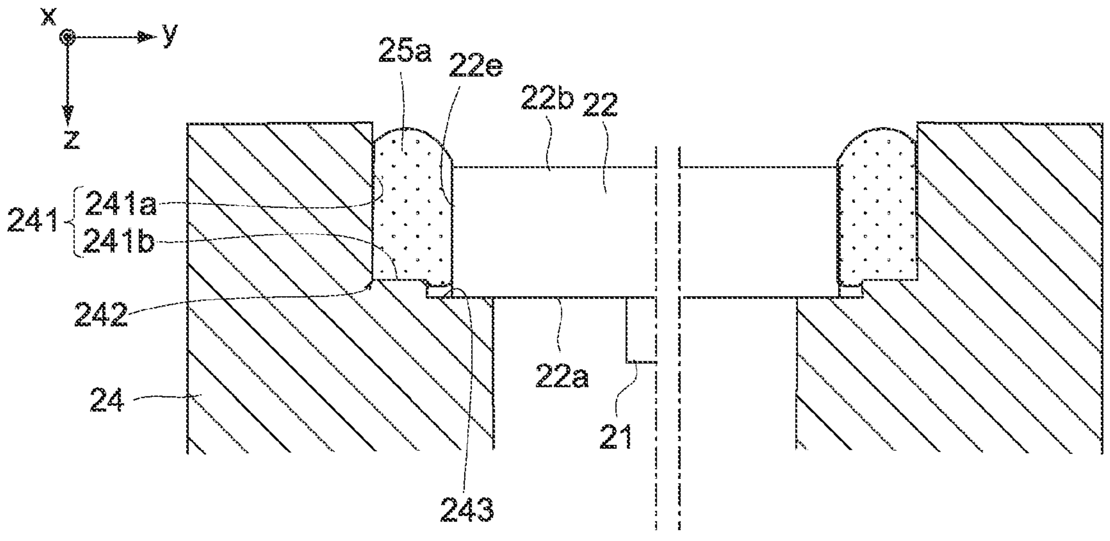
FIG. 8 is a cross-sectional view showing the positional relationship between the surfaces in the holder holding portion 242 before 6-axis alignment after the adhesive is applied.
Figure 9:
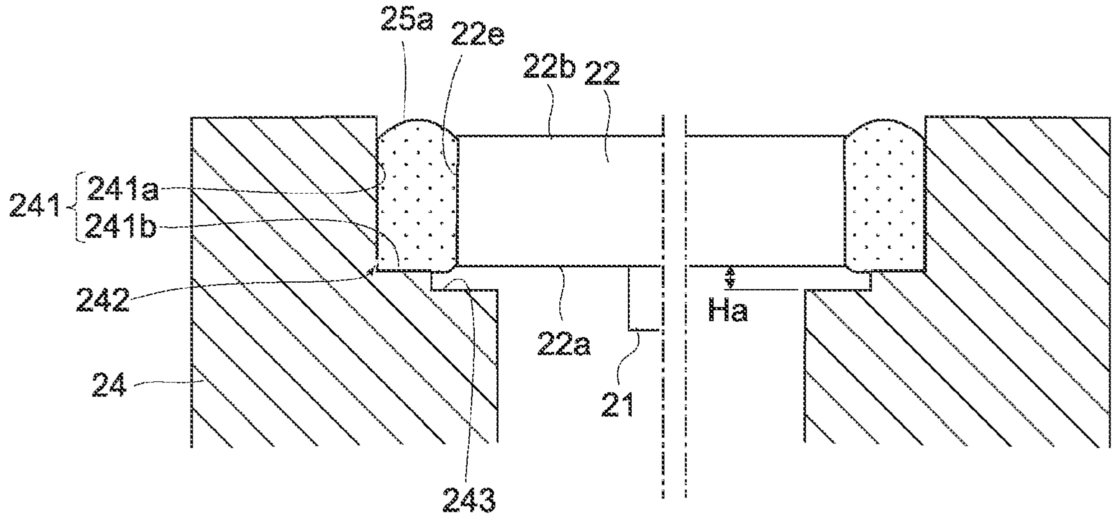
FIG. 9 is a cross-sectional view showing the positional relationship between the surfaces after completion of the 6-axis alignment.
Figure 10:
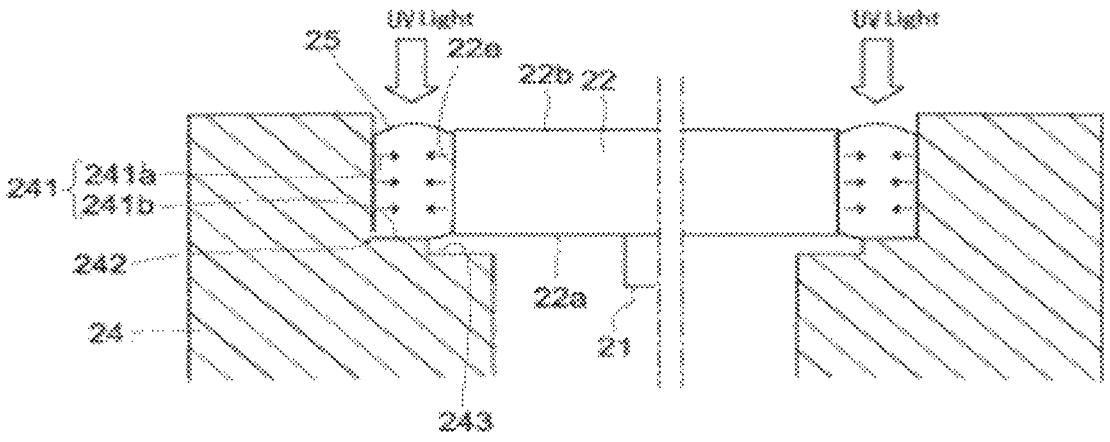
FIG. 10 is a cross-sectional view showing the positional relationship between the surfaces after UV-curing.

FIG. 8 is a cross-sectional view showing the positional relationship of the surfaces (such as the side surface 22*e* of the substrate 22, the substrate bonding surface 241, and the seating surface 243) in the holder holding portion 242 before 6-axis alignment after the adhesive is applied. FIG. 9 is a cross-sectional view showing the positional relationship of the surfaces after the 6-axis alignment is completed. FIG. 10 is a cross-sectional view showing the positional relationship of the surfaces after UV-curing.

As shown in FIGS. 8 and 9, this example shows a case where the substrate 22 is moved to a position floated by the 6-axis alignment from the seating surface 243 by a height Ha (see FIG. 9) with respect to the holder 24. In this state, as shown in FIG. 10, the adhesive 25*a* is UV-cured by irradiating the adhesive 25*a* with UV light through the gap between the substrate-side-surface-facing surface 241*a* of the holder holding portion 242 and the side surface 22*e* of the substrate 22.

At that time, a shrinkage force is generated in the cured bonding portion 25. In the shrinkage force generated in the bonding portion 25, the shrinkage forces in the xy directions are canceled by the shrinkage forces of the bonding portion 25 on the opposite side with the substrate 22 interposed therebetween, and thus the position of the substrate 22 hardly fluctuates. In addition, since the bonding portion 25 is also bonded to the bottom forming surface 241*b* of the holder holding portion 242, a force for shrinking the bonding portion 25 to the bottom surface side in the z direction is generated by curing. However, since UV-curing of the adhesive 25*a* progresses from the side opposite to the bottom forming surface 241*b* by UV irradiation from the side opposite to the bottom forming surface 241*b*, the shrinkage force generated by curing of the adhesive 25*a* in the vicinity of the bottom forming surface 241*b* does not affect the overall height of the bonding portion 25 in the z direction. In other words, a fatal-level displacement due to the UV-curing shrinkage of the adhesive 25*a* does not occur in the positional relationship in which the 6-axis alignment is completed.

As described above, according to the vehicle-mounted camera 2 and the manufacturing method therefor as the first embodiment according to the present disclosure, the substrate 22 and the holder 24 are bonded to each other via the bonding portion 25, which is made of the adhesive 25*a* having photo-curing property, on a surface intersecting the imaging surface of the imaging device 21. This makes it possible to suppress the influence of the displacement of the 6-axis alignment position due to the curing shrinkage of the adhesive 25*a*, and to obtain a good focusing accuracy.

Modified Example 1

Figure 11:
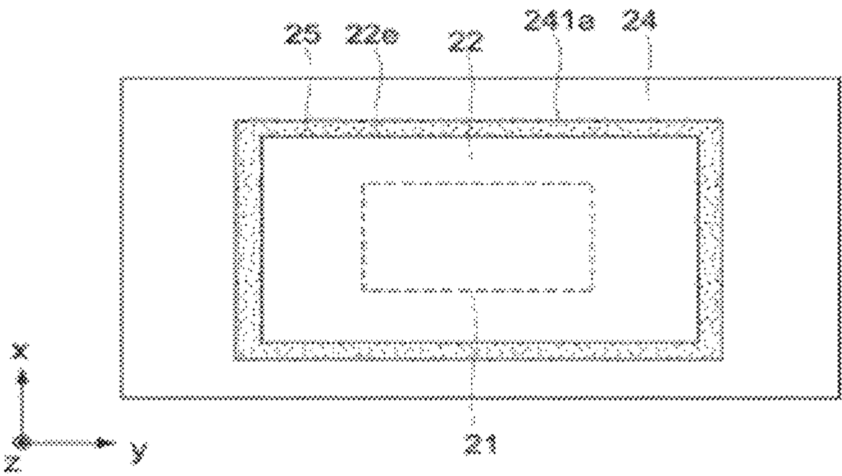
FIG. 11 is a plan view of the holder, the substrate, and the bonding portion of the first embodiment viewed from the optical axis direction.

In the first embodiment, as shown in FIG. 11, the side surface 22*e* of the entire circumference of the substrate 22 is bonded to the holder holding portion 242 of the holder 24 via the bonding portion 25 to fill the gap between the holder holding portion 242 of the holder 24 and the side surface 22*e* of the substrate 22, and a closed space surrounding the imaging surface of the imaging device 21 is ensured.

However, the present technology is not necessarily limited to this configuration.

Figure 12:
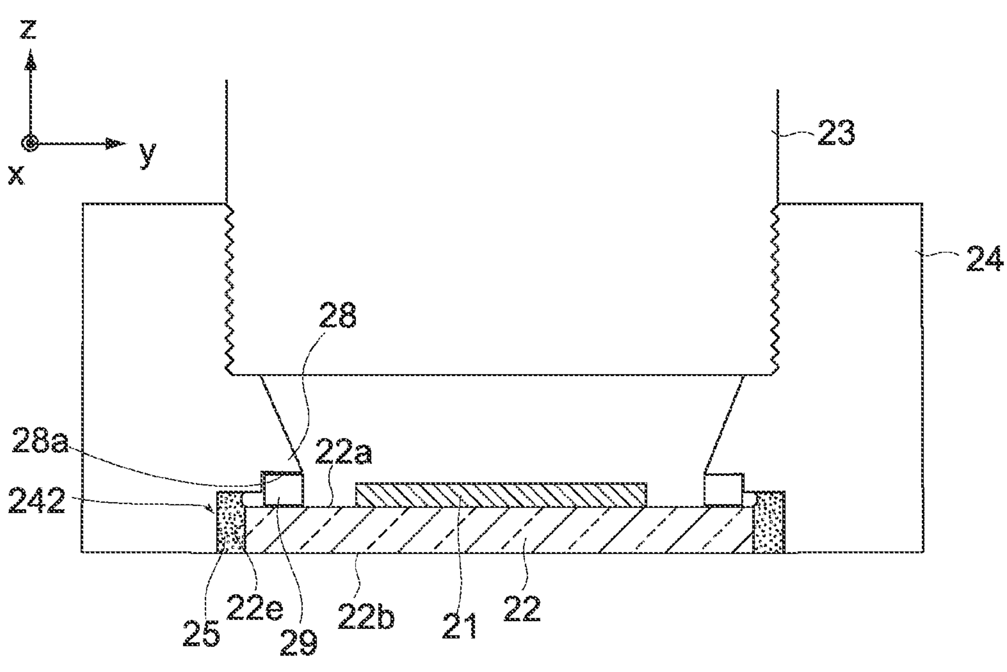
FIG. 12 is a cross-sectional view showing a modified example in which a dust-proof cushion is employed.

For example, as shown in FIG. 12, a cushion holding projection 28 may be provided to the holder 24, the cushion holding projection 28 having a surface 28*a* facing the imaging device mounting surface 22*a* of the substrate 22, and a dust-proof cushion 29 may be interposed between the facing surface 28*a* of the cushion holding projection 28 and the imaging device mounting surface 22*a* of the substrate 22 so as to surround the imaging surface of the imaging device 21 in plan view. The dust-proof cushion 29 makes it possible to prevent the entry of dust or the like from the gap between the holder holding portion 242 of the holder 24 and the side surface 22*e* of the substrate 22.

Figure 13:
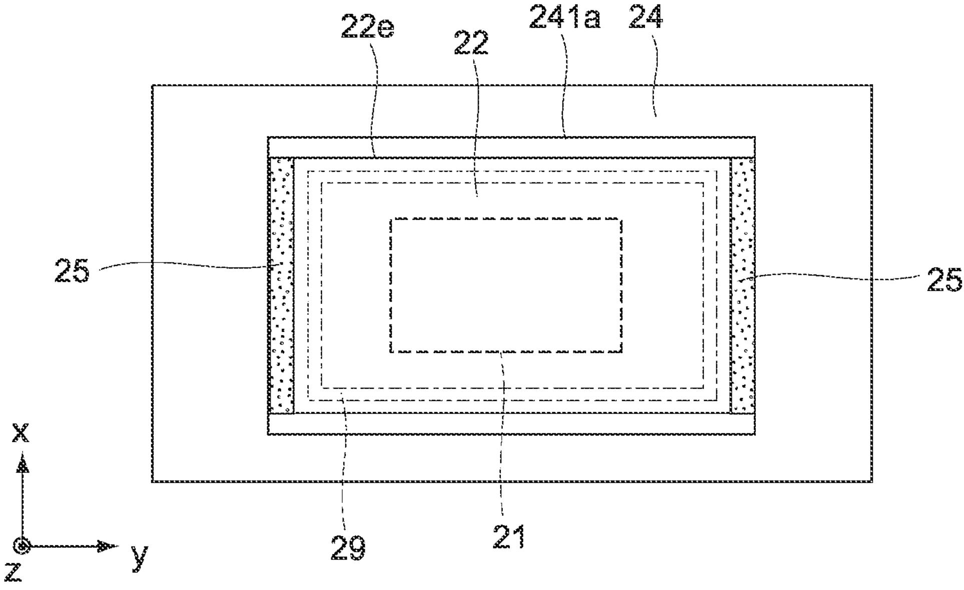
FIG. 13 is a plan view showing a modified example in which the bonding portion is partially provided.
Figure 14:
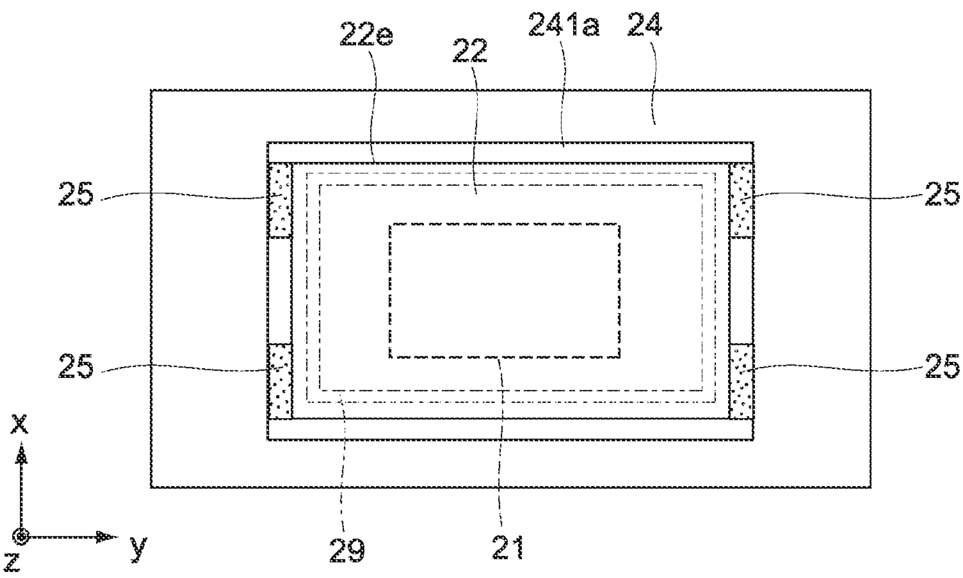
FIG. 14 is a plan view showing another modified example in which the bonding portion is partially provided.

If the dust-proof cushion 29 is employed in such a manner, it is not essential to perform bonding by the integral bonding portion 25 continuous on the side surface 22*e* of the entire circumference of the substrate 22. For example, as shown in FIG. 13, it is possible to employ a configuration in which only the side surfaces of a pair of opposing sides of the substrate 22 are bonded to the holder 24 side by the bonding portion 25. Alternatively, as shown in FIG. 14, a configuration in which the bonding portions 25 are provided to each side only at both ends thereof may be adopted.

Modified Example 2

In addition, if the dust-proof cushion 29 described above is employed, it is also possible to adopt a configuration in which a plurality of bonding portions made of a plurality of types of adhesives is used in combination. If a UV-curable adhesive and a thermosetting adhesive are used as a plurality of types of adhesives, it is possible to improve the high-temperature resistance of the entire bonding portion 25 by taking advantage of the fact that the thermosetting adhesive has high heat resistance.

Figure 15:
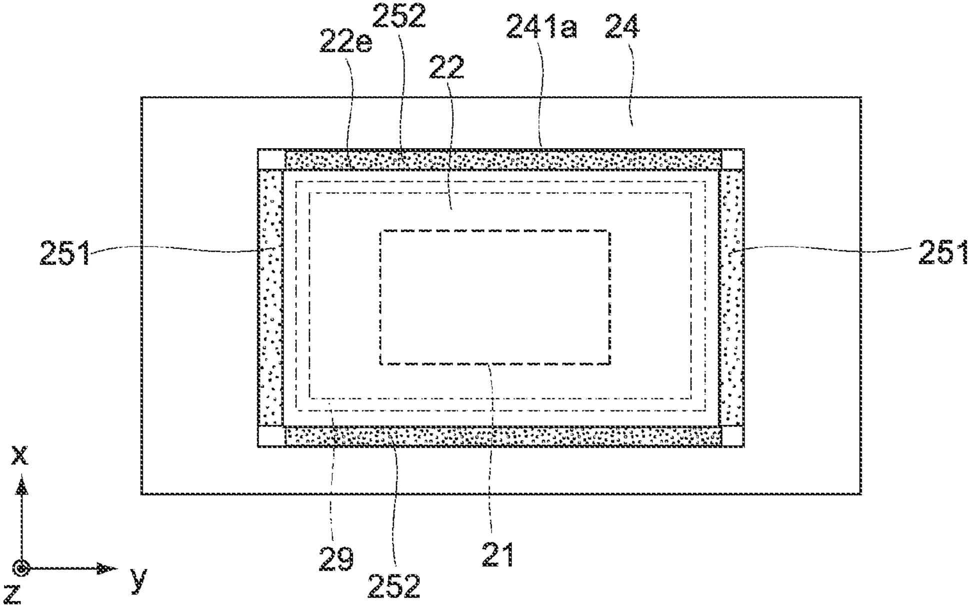
FIG. 15 is a plan view showing a modified example in which a first bonding portion 251 using a UV-curable adhesive and a second bonding portion 252 using a thermosetting adhesive are used in combination.
Figure 16:
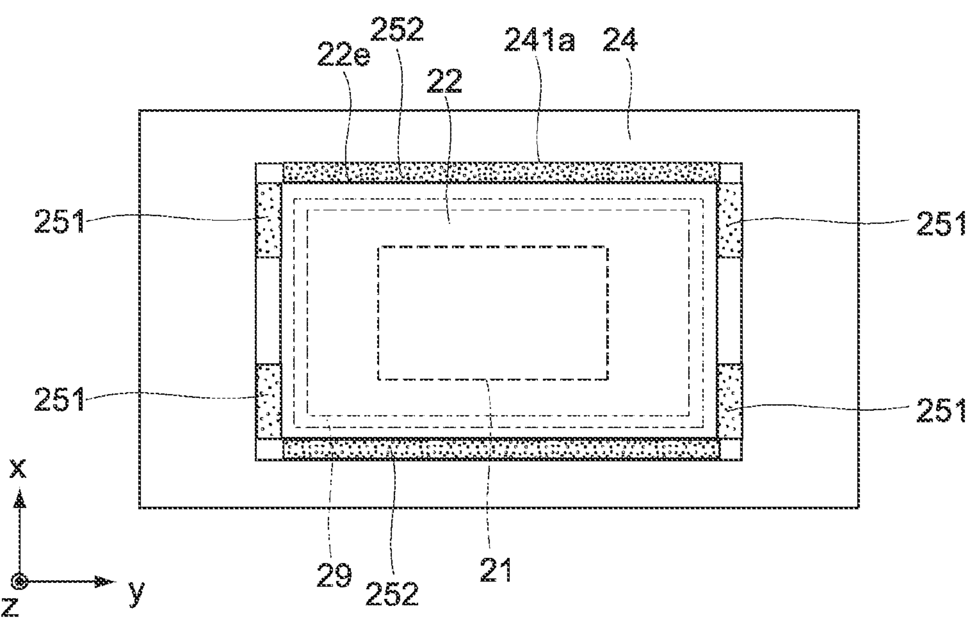
FIG. 16 is a plan view showing another modified example in which the first bonding portion 251 using the UV-curable adhesive and the second bonding portion 252 using the thermosetting adhesive are used in combination.

FIG. 15 is a diagram showing a configuration example in the case where a first bonding portion 251 made of a UV-curable adhesive and a second bonding portion 252 made of a thermosetting adhesive are used in combination. In this example, the first bonding portion 251 made of a UV-curable adhesive is employed for bonding at the sides facing each other in the y direction of the substrate 22, and the second bonding portion 252 made of a thermosetting adhesive is employed for bonding at the sides facing each other in the x direction. Alternatively, as shown in FIG. 16, it is also possible to employ a configuration in which the first bonding portion 251 made of a UV-curable adhesive is employed for bonding at only both ends of each of one pair of sides facing each other of the substrate 22, and the second bonding portion 252 made of a thermosetting adhesive is employed for bonding at the sides of the other pair.

Modified Example 3

As in the first embodiment, if the structure in which the side surface 22*e* of the substrate 22 and the substrate bonding surface 241 of the holder holding portion 242 of the holder 24 are bonded to each other by the bonding portion 25 over the entire circumference is employed, and a UV-curable/thermosetting hybrid type is employed as the adhesive 25*a*, the pressure in the closed space surrounding the imaging device 21 at the time of thermal curing increases with an increase in temperature. When the pressure in the closed space increases, a large shear stress is generated on the bonding portion 25 through the planar surface of the substrate 22, and there is a possibility that the bonding portion 25 is broken, for example.

Figure 17:
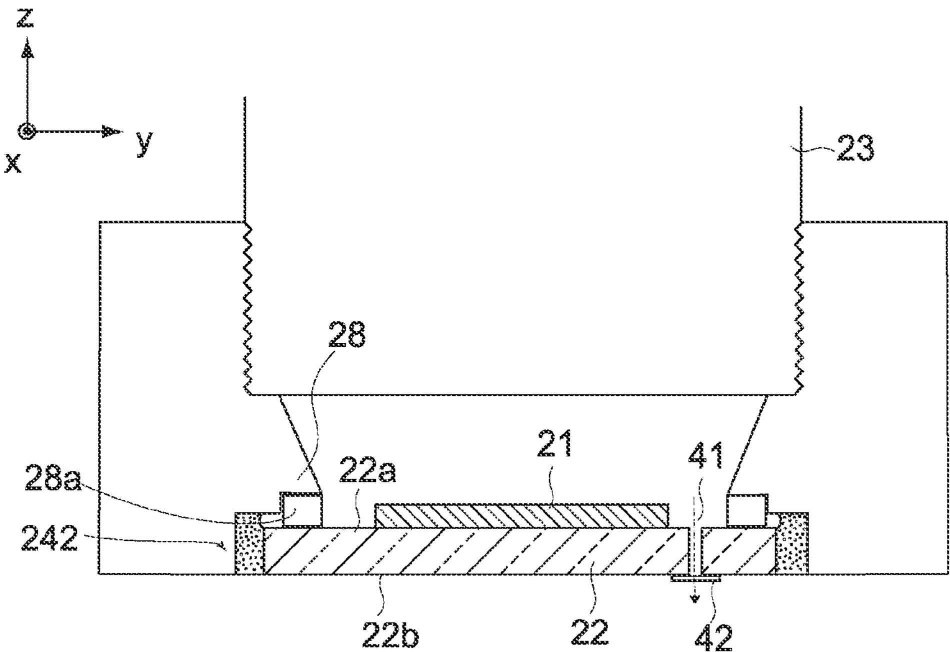
FIG. 17 is a cross-sectional view showing a modified example in which a through-hole of the substrate is employed.

FIG. 17 is a cross-sectional view showing a configuration example capable of suppressing the pressure increase in a space surrounding the imaging device 21 on the substrate 22 while preventing the entry of dust, moisture, and the like into the space.

As shown in the figure, outside the imaging device mounting area of the substrate 22, a through-hole 41 for ventilation with a filter function is provided. The through-hole 41 prevents the entry of dust, moisture, and the like into the space surrounding the imaging device 21 by the substrate 22, the holder 24, the lens unit 23, and the like, and the filter function provided to the through-hole 41 prevents the entry of dust, moisture, and the like into the space surrounding the imaging device 21.

As the filter function, a sheet 42 or the like made of a material having waterproof property and breathability can be used. For example, the sheet 42 is attached to a surface 22*b* of the substrate 22 on the opposite side of the imaging device mounting surface 22*a* by using an adhesive tape or the like.

Other Modified Examples

Next, a modified example of the holder holding portion 242 in the vehicle-mounted camera according to the present disclosure will be described.

Figure 18:
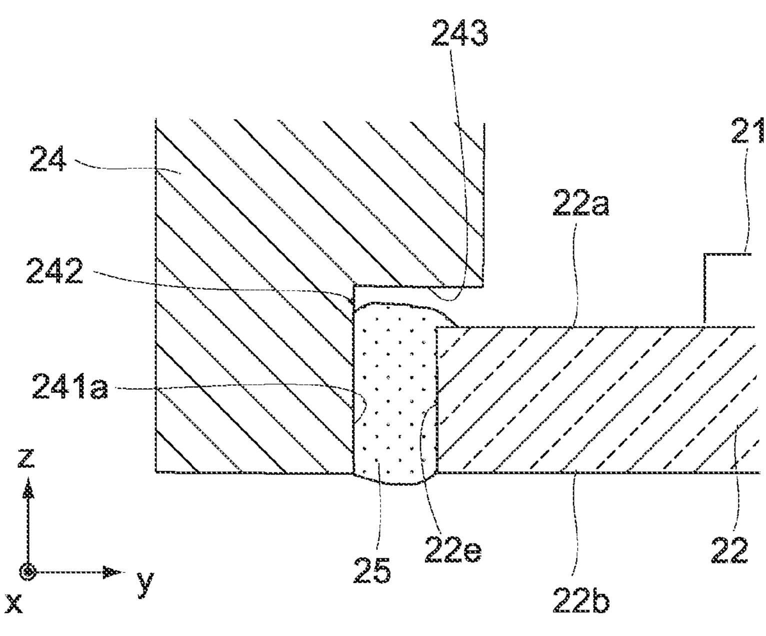
FIG. 18 is a cross-sectional view showing a modified example of the structure of the bonding portion between the holder and the substrate.

FIG. 18 is a cross-sectional view showing a modified example of the holder holding portion 242.

As shown in the figure, the holder 24 may be configured to have only a substrate-side-surface-facing surface 241*a* facing the side surface 22*e* of the substrate 22 as a surface to be bonded to the side surface 22*e* of the substrate 22 by the bonding portion 25.

This configuration also makes it possible to suppress the displacement of the 6-axis alignment position due to the shrinkage forces in the xyz directions, which are generated in the bonding portion 25 due to curing of the adhesive 25*a*.

Figure 19:
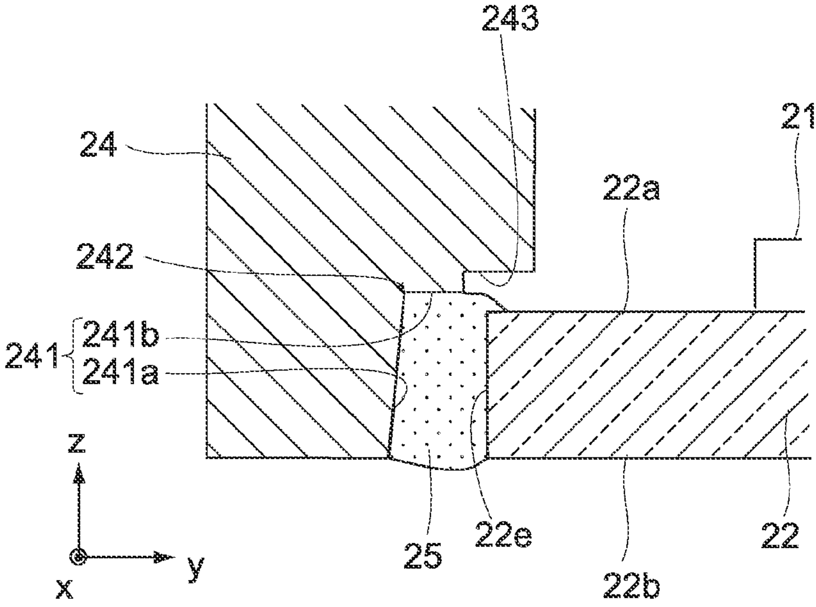
FIG. 19 is a cross-sectional view showing another modified example of the structure of the bonding portion between the holder and the substrate.

Note that the substrate-side-surface-facing surface 241*a* is not limited to a surface parallel to the side surface 22*e* of the substrate 22. For example, as shown in FIG. 19, the substrate-side-surface-facing surface 241*a* may be a surface inclined with respect to the side surface 22*e* of the substrate 22.

Figure 20:
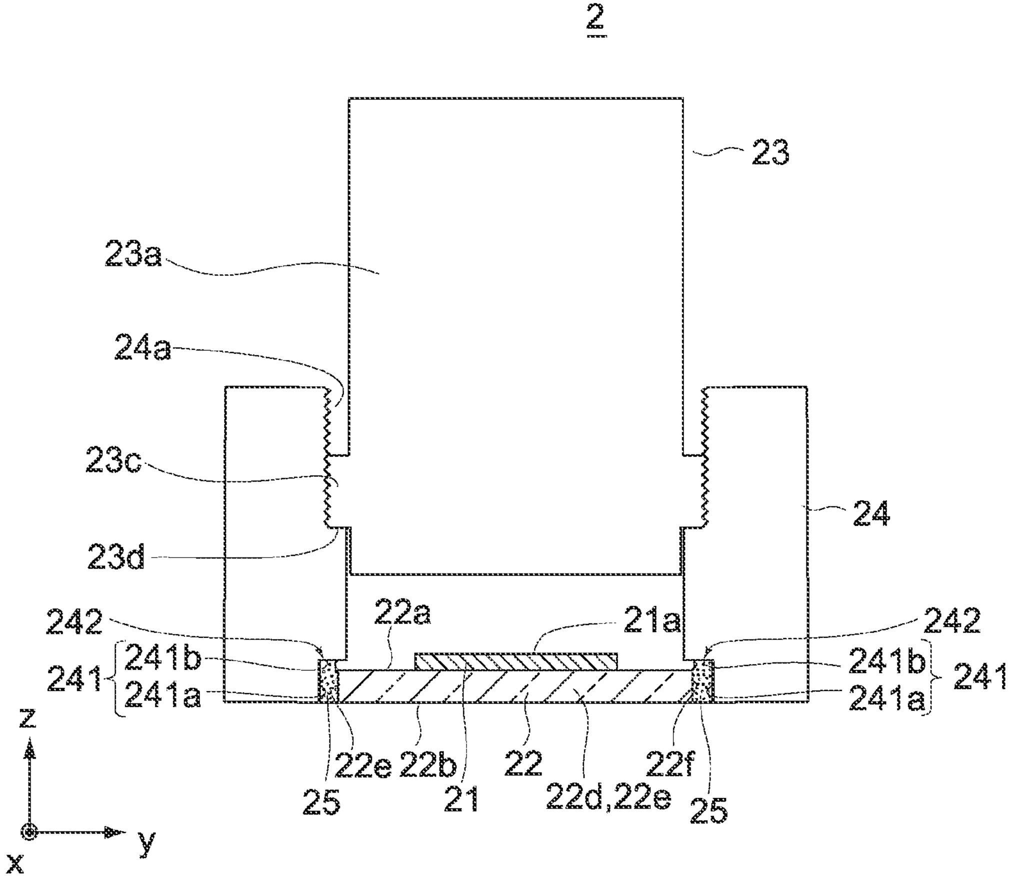
FIG. 20 is a view showing a modified example of the connection between a lens unit 23 and a holder 24 in the vehicle-mounted camera 2 of the first embodiment according to the present disclosure.

FIG. 20 is a view showing a modified example of the connection between the lens unit 23 and the holder 24.

In this modified example 4, a flange portion 23*c* is provided at a position of substantially intermediate height of the lens barrel portion 23*a* to be inserted into the lens barrel receiving hole 24*a* of the holder 24, and the lens unit receiver 24*b* protruding to the bottom inner peripheral surface of the lens barrel receiving hole 24*a* receives a distal end surface 23*d* that is a part of the flange portion 23*c* of the lens barrel portion 23*a* in the optical axis direction, so that the lens unit 23 is held by the holder 24.

The technology according to the present disclosure is suitable for a vehicle-mounted camera utilizing an image sensor whose imaging surface has the vertical and horizontal sizes of 4.32 mm and 8.64 mm (1/1.7 type) and whose number of pixels is several M pixels or more (particularly, 7 M pixels or more), and including an optical system in which the allowable range of the focal position deviation is within ±several μm (e.g., ±3 μm). Further, it is suitable for the case of utilizing an image sensor (area per pixel is less than 6.1 (μm×μm)) having a higher density of pixels than the above image sensor of 7 M pixels of the 1/1.7 type, and the case of a vehicle-mounted camera including an optical system in which the allowable range of the focal position deviation is within ±several μm (e.g., ±3 μm).

Application Examples

The technology according to the present disclosure may be applied to a variety of products. For example, the technology according to the present disclosure may be applied to a drive control system for controlling driving of an automobile on the basis of a video of a camera. The drive control system will be described below.

[Drive Control System 100]

A drive control system of an application example according to the present technology is a system used to control driving of the automobile M using the vehicle-mounted camera 2 described above. Specifically, the drive control system controls a driving force generating mechanism, a braking mechanism, a steering mechanism, and the like of the automobile using an image captured using the vehicle-mounted camera 2. The image captured by the vehicle-mounted camera 2 is transmitted to the drive control systems in the form of high-quality image data (raw image data) that has not been compressed and encoded.

The drive control system may have a configuration corresponding to a function necessary for the automobile. Specifically, examples of a function that can be implemented by the drive control system include a driving assistance function and an autonomous driving function. A configuration of the drive control system making it possible to implement the driving assistance function and the autonomous driving function will be described below.

(Driving Assistance Function)

The driving assistance function is typically a function of advanced driver-assistance systems (ADAS) including collision avoidance, shock mitigation, following driving (maintaining a following distance), vehicle speed maintaining driving, a warning of collision, a warning of deviation from a lane, and the like. A drive control system 100 may be configured such that those driving assistance functions can be implemented.

Figure 21:
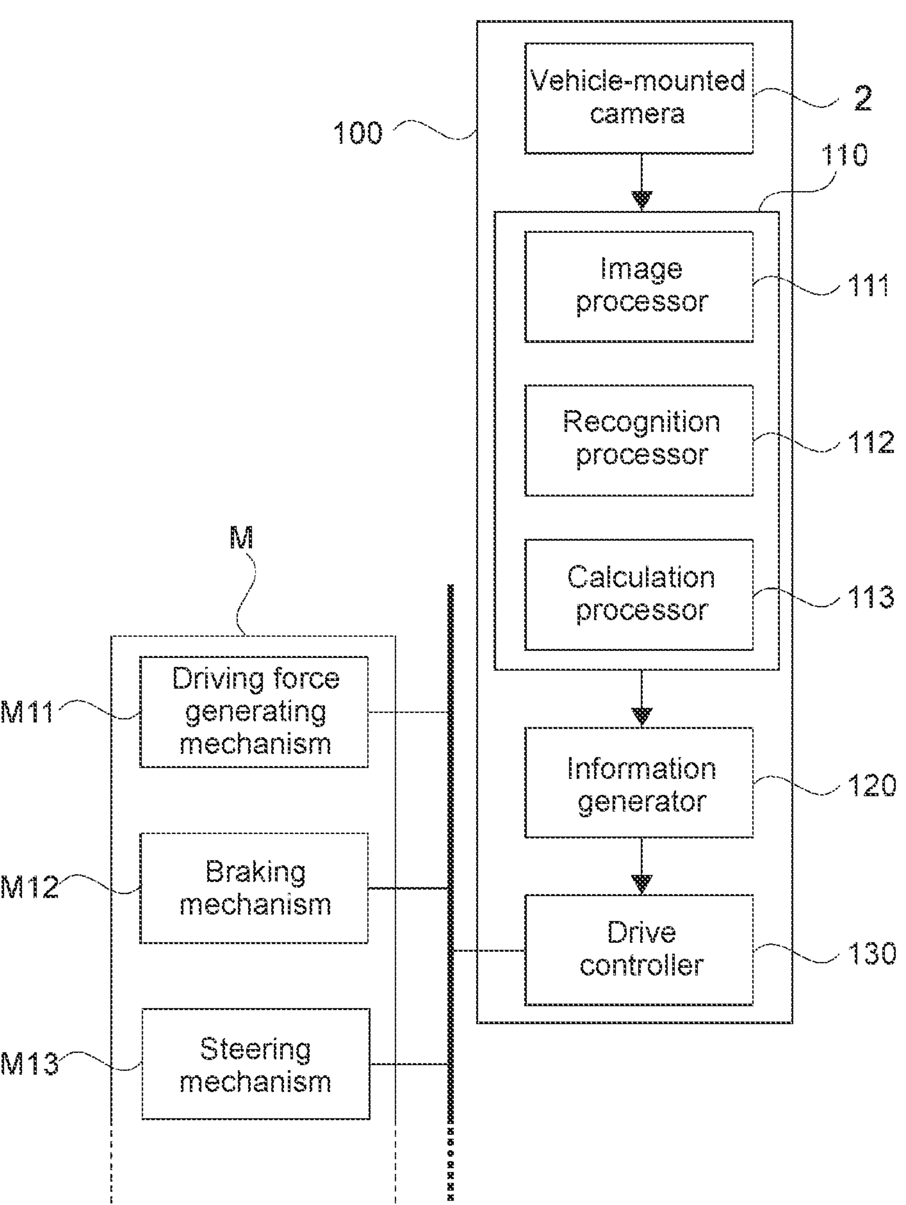
FIG. 21 is a block diagram showing a configuration of a drive control system 100, which makes it possible to implement a driving assistance function as an application example of the vehicle-mounted camera 2 according to the present disclosure.

FIG. 21 is a block diagram showing the configuration of the drive control system 100 making it possible to implement the driving assistance function. The drive control system 100 includes the vehicle-mounted camera 2, a processor 110, an information generator 120, and a drive controller 130. The processor 110 includes an image processor 111, a recognition processor 112, and a calculation processor 113.

The respective structural elements of the drive control system 100 are connected to each other through a communication network. The communication network may be, for example, a vehicle-mounted communication network that conforms to any standard such as a controller area network (CAN), a local interconnect network (LIN), a local area network (LAN), or FlexRay (registered trademark).

Figure 22:
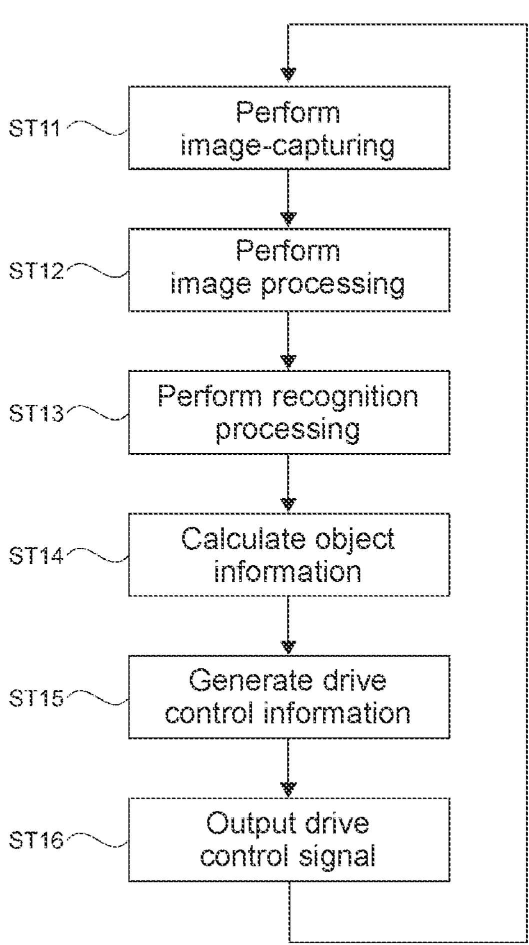
FIG. 22 is a flowchart showing a drive control method performed by the drive control system 100 shown in FIG. 21.

FIG. 22 is a flowchart showing a drive control method performed by the drive control system 100 shown in FIG. 21. The drive control method shown in FIG. 22 includes Step ST11 of image-capturing, Step ST12 of image processing, Step ST13 of recognition processing, Step ST14 of object-information calculation, Step ST15 of drive-control-information generation, and Step ST16 of drive-control-signal output.

In Step ST11 of image-capturing, the vehicle-mounted camera 2 captures an image of the scenery ahead of the automobile M through a windshield M01 to generate an image of the scenery. For example, the vehicle-mounted camera 2 transmits the image to the processor 110 using an in-vehicle communication section mounted on a circuit board.

The processor 110 typically includes an electronic control unit (ECU), and processes the image generated by the vehicle-mounted camera 2. More specifically, in the processor 110, the image processor 111 performs Step ST12 of image processing, the recognition processor 112 performs Step ST13 of recognition processing, and the calculation processor 113 performs Step ST14 of object-information calculation.

In Step ST12 of image processing, the image processor 111 performs image processing on the image to generate a processed image. The image processing performed by image processor 111 is typically processing performed to make it easy to recognize an object in the image, and examples of the image processing performed by image processor 111 include an automatic exposure control, an automatic white-balance adjustment, and high dynamic range combining.

Note that, in Step ST12 of image processing, at least part of the image processing may be performed by an image processor mounted on the substrate 22 of the vehicle-mounted camera 2 or another circuit board connected to the substrate 22. Note that, when the image processor of the vehicle-mounted camera 2 performs all of the image processing of Step ST12 of image processing, the processor 110 does not have to include the image processor 111.

In Step ST13 of recognition processing, the recognition processor 112 performs recognition processing on the processed image to recognize an object in the processed image. Note that the object recognized by the recognition processor 112 is not limited to a three-dimensional object, and examples of the recognized object include a vehicle, a pedestrian, an obstacle, a traffic light, a traffic sign, a lane of a road, and a curb.

In Step ST14 of calculation processing, the calculation processor 113 calculates object information related to an object in the processed image. Examples of the object information calculated by the calculation processor 113 include the shape of an object, the distance to an object, and the movement direction and the movement speed of an object. The calculation processor 113 uses a plurality of temporally consecutive processed images to calculate dynamic object information.

Figure 23:
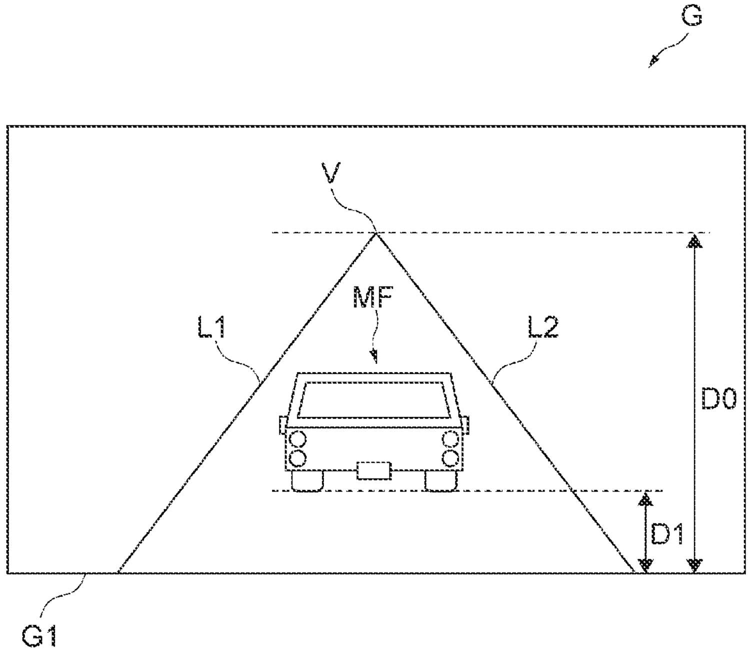
FIG. 23 is a view showing an example of a processed image G generated by an image processing unit 111 in the drive control system 100 of FIG. 21.

A method of calculating a following distance to a preceding automobile MF is described as an example of the method of calculating object information that is performed by the calculation processor 113. FIG. 23 shows an example of a processed image G generated by the image processor 111. The preceding automobile MF, and two lanes L1 and L2 that define a travel lane appear in the processed image G shown in FIG. 23.

First, a vanishing point V at which the two lanes L1 and L2 intersect in the processed image G is obtained. Note that the vanishing point V may be obtained from other objects without using the lanes L1 and L2. For example, the calculation processor 113 may also obtain the vanishing point V using, for example, a curb, or a movement trajectory of a fixed object such as a traffic sign in a plurality of processed images.

Next, a distance D0 from a lower edge G1 of the processed image to the vanishing point V (a dimension in an up-down direction of the image), and a distance D1 from the lower edge G1 of the processed image to the preceding automobile MF (a dimension in the up-down direction of the image) are obtained. The following distance to the preceding automobile MF can be obtained using the distances D0 and D1. For example, the use of a ratio between the distance D0 and the distance D1 makes it possible to calculate the following distance to the preceding automobile MF. As described above, when the distance is calculated on the basis of the pixel position of the object in the captured image, the detection position of the object may be shifted if the image that is not in focus is used, so that the accuracy of the distance to be calculated may be deteriorated. In this respect, the present invention is particularly suitable for a camera that performs the image processing as described above.

The processor 110 transmits, to the information generator 120, data including the processed image and the object information that are obtained in Steps ST12 to ST14. Note that the processor 110 is not limited to the configuration described above, and, for example, the processor 110 may include a structural element other than image processor 111, the recognition processor 112, and the calculation processor 113.

In Step ST15 of drive-control-information generation, the information generator 120 generates drive control information including details of driving necessary for the automobile M. More specifically, on the basis of the data transmitted by the processor 110, the information generator 120 determines details of driving to be performed by the automobile M, and generates drive control information including the details of driving.

Examples of the details of driving of the automobile M include a change in speed (acceleration and deceleration) and a change in traveling direction. The following are specific examples: when the following distance of the automobile M to the preceding automobile MF is small, the information generator 120 determines that the automobile M is to be decelerated, and when the automobile M is likely to deviate from its lane, the information generator 120 determines that the traveling direction is to be changed such that the automobile M moves toward a lane center.

The information generator 120 transmits the drive control information to the drive controller 130. Note that the information generator 120 may generate information other than the drive control information. For example, the information generator 120 may detect the brightness in the ambient environment from a processed image, and may generate information regarding an illumination control performed to turn on a headlight of the automobile M when it is dark in the ambient environment.

In Step ST16 of drive-control-signal output, the drive controller 130 outputs a drive control signal on the basis of the drive control information. For example, the drive controller 130 can accelerate the automobile M using the driving force generating mechanism M11, decelerate the automobile M using the braking mechanism M12, and change a traveling direction of the automobile M using the steering mechanism M13.

(Autonomous Driving Function)

The autonomous driving function is a function of autonomously driving the automobile M without an operation being performed by a driver. In order to implement an autonomous driving function, there is a need for a more sophisticated drive control, compared to the case of the driving assistance function. The use of the vehicle-mounted camera 2 being capable of generating a high-quality image enables the drive control system 100 to more accurately perform a sophisticated drive control that makes it possible to implement an autonomous driving function.

Figure 24:
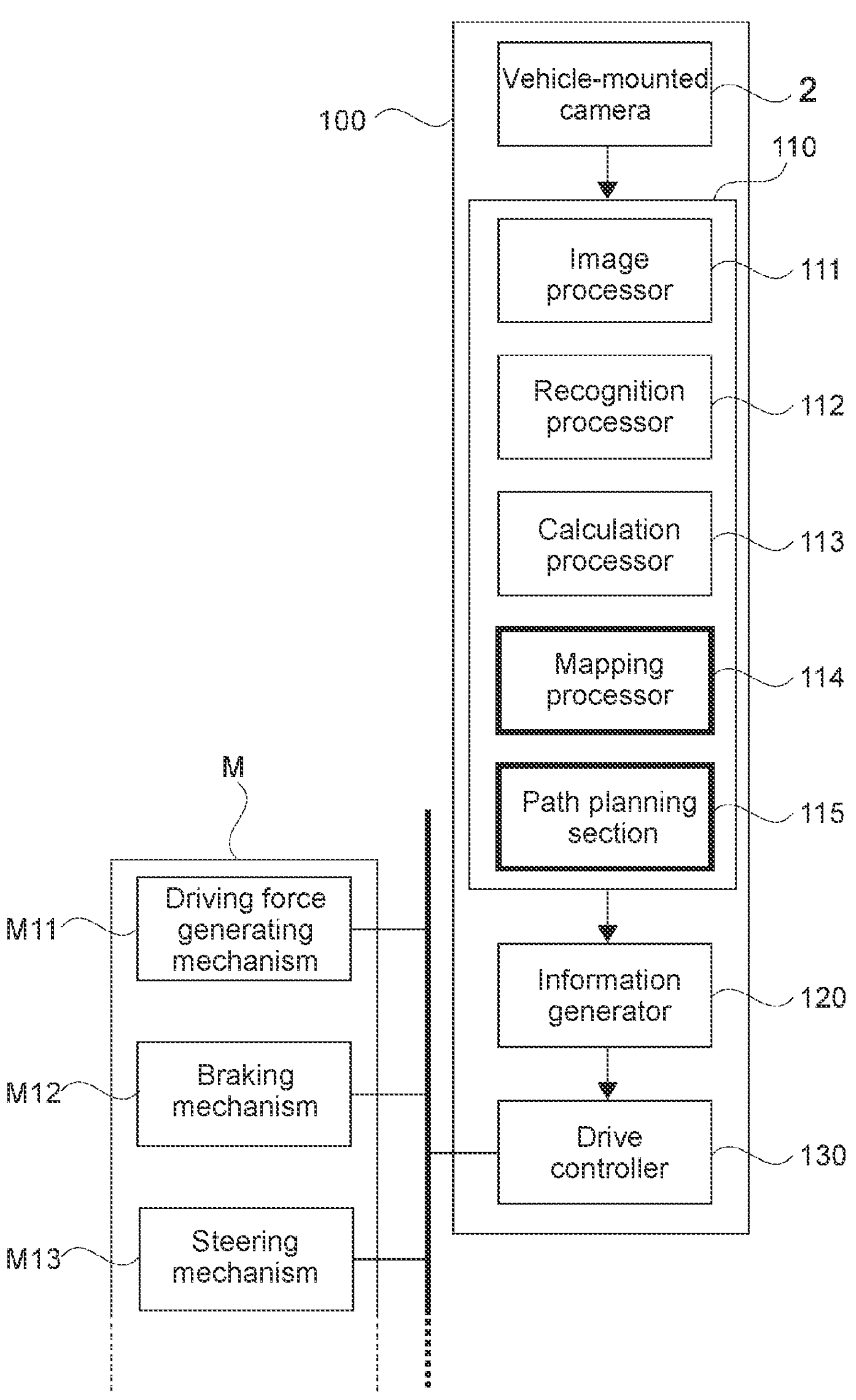
FIG. 24 is a block diagram showing a configuration of the drive control system 100, which makes it possible to implement an autonomous driving function as an application example of the vehicle-mounted camera 2 according to the present disclosure.

FIG. 24 is a block diagram showing a configuration of the drive control system 100 making it possible to implement an autonomous driving function. In addition to the respective structural elements shown in FIG. 21, this drive control system 100 further includes a mapping processor 114 and a path planning section 115 that are included in the processor 110. Descriptions of structural elements similar to those shown in FIG. 21 are omitted below as appropriate.

Figure 25:
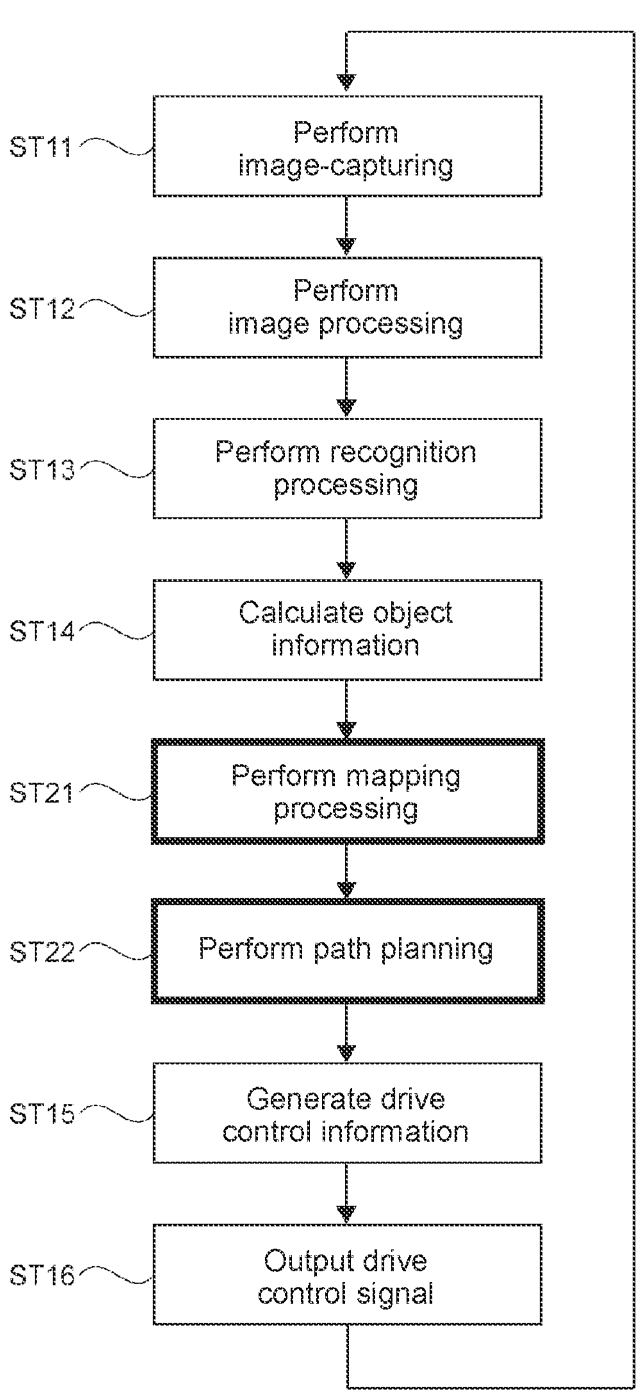
FIG. 25 is a flowchart showing a drive control method performed by the drive control system 100 shown in FIG. 24.

FIG. 25 is a flowchart showing a drive control method performed by the drive control system 100 shown in FIG. 24. In addition to the respective steps shown in FIG. 22, the drive control method shown in FIG. 25 includes Step ST21 of mapping processing, which is performed by the mapping processor 114, and Step ST22 of path planning, which is performed by the path planning section 115.

As shown in FIG. 25, Step ST21 of mapping processing and Step ST22 of path planning are performed between Step ST14 of object-information calculation and Step ST15 of drive-control-information generation. Step ST22 of path planning is performed after Step ST21 of mapping processing.

In Step ST21 of mapping processing, the mapping processor 114 performs spatial mapping using a processed image and object information to create a digital map. The digital map created by the mapping processor 114 is a three-dimensional map created by combining static information and dynamic information that are necessary to perform autonomous driving.

In the drive control system 100, it is possible to create a high-resolution digital map using the mapping processor 114 since a high-quality image is obtained using the vehicle-mounted camera 2. Note that the mapping processor 114 can create a digital map including more information by acquiring information other than the image obtained using the vehicle-mounted camera 2.

For example, the mapping processor 114 can acquire information from, for example, a surrounding information detector and a positioning section that are included in the automobile M. Further, the mapping processor 114 can acquire various types of information by communicating with various apparatuses situated in the external environment through a vehicle-exterior communication section that makes it possible to perform a vehicle-exterior communication.

The surrounding information detector is configured as, for example, an ultrasonic sensor, a radar device, a LIDAR (light detection and ranging, laser imaging detection and ranging) device, or the like. The mapping processor 114 can also acquire, from the surrounding information detector, information regarding, for example, regions in the rear and on the lateral side of the automobile M that is not easily obtained from the vehicle-mounted camera 2.

The positioning section is capable of receiving, for example, a global navigation satellite system (GNSS) signal from a GNSS satellite (such as a global positioning system (GPS) signal from a GPS satellite) and performing positioning. The mapping processor 114 can acquire information regarding the position of the automobile M from the positioning section.

The vehicle-exterior communication section may use, for example, Global System of Mobile Communications (GSM) (registered trademark), WiMAX (registered trademark), Long-Term Evolution (LTE) (registered trademark), LTE-advanced (LTE-A), a wireless LAN (also referred to as Wi-Fi (registered trademark)), Bluetooth (registered trademark), or the like.

In Step ST22 of path planning, the path planning section 115 performs path planning performed to determine a traveling route of the automobile M, using a digital map. Examples of the path planning include various processes such as detection of an empty space on a road, and prediction of the movement of an object such as a vehicle and a human.

After Step ST22 of path planning, the processor 110 collectively transmits, to the information generator 120, data including the digital map and a result of the path planning that are obtained in Steps ST21 and ST22, in addition to the data including the processed image and the object information that are obtained in Steps ST12 to ST14.

In Step ST15 of drive-control-information generation, the information generator 120 generates drive control information including details of driving performed to cause the automobile M to travel along a traveling route in accordance with the path planning determined in Step ST22 of path planning. The information generator 120 transmits the generated drive control information to the drive controller 130.

In Step ST16 of drive-control-signal output, the drive controller 130 outputs a drive control signal on the basis of the drive control information. In other words, the drive controller 130 controls driving of the driving force generating mechanism M11, the braking mechanism M12, the steering mechanism M13, and the like such that the automobile M can safely travel along a traveling route in accordance with the path planning.

When processes such as object position detection, distance measurement, map creation, and path planning are performed using a captured image, the accuracy of the processes may be deteriorated if an image that is not in focus is used for the processes. In this regard, the vehicle-mounted camera 2 according to the present disclosure can be suitably adopted particularly for a camera that performs the image processing as described above.

[Other Configurations of Present Technology]

Note that the present technology can have the following configurations.

(1) A vehicle-mounted camera, including:

a substrate on which an imaging device is mounted;

a holder that holds a lens unit; and a bonding portion that is made of an adhesive having photo-curing property and bonds the substrate and the holder to each other on at least a surface intersecting an imaging surface of the imaging device.

(2) The vehicle-mounted camera according to (1), in which the substrate has a side surface perpendicular to the imaging surface, the holder has a substrate-side-surface-facing surface that faces the side surface of the substrate, and the bonding portion is configured to bond the side surface of the substrate and the substrate-side-surface-facing surface to each other.

(3) The vehicle-mounted camera according to (2), in which the holder further includes a bottom forming surface that forms a bottom surface of a space for stopping the adhesive before subjected to photo-curing between the side surface of the substrate and the substrate-side-surface-facing surface, and the bonding portion is configured to bond the side surface of the substrate to the substrate-side-surface-facing surface and the bottom forming surface.

(4) The vehicle-mounted camera according to any one of (1) to (3), in which the holder further includes a seating surface for receiving a back surface of a mounting surface for the imaging device of the substrate and positioning the substrate such that the space is formed before aligning the imaging surface of the imaging device and the lens unit.

(5) The vehicle-mounted camera according to any one of (1) to (4), in which the adhesive is a hybrid adhesive having thermosetting property in addition to the photo-curing property.

(6) The vehicle-mounted camera according to any one of (1) to (5), in which the bonding portion is provided to correspond to an entire circumference of the substrate.

(7) The vehicle-mounted camera according to any one of (1) to (6), further including a dust-proof cushion disposed between the holder and a mounting surface for the imaging device of the substrate to correspond to an entire circumference of the substrate.

(8) The vehicle-mounted camera according to any one of (1) to (7), in which the bonding portion includes a first bonding portion made of the adhesive having the photo-curing property or a hybrid adhesive having thermosetting property in addition to the photo-curing property, and a second bonding portion made of a thermosetting adhesive.

(9) The vehicle-mounted camera according to any one of (1) to (8), in which the substrate further includes a through-hole with a filter function, the through-hole ventilating a space around the imaging surface of the imaging device on the substrate and outside of the space.

(10) A method of manufacturing a vehicle-mounted camera, including:

applying an adhesive having photo-curing property between a side surface of a substrate on which an imaging device is mounted and a substrate-side-surface-facing surface of the holder that holds the lens unit, the substrate-side-surface-facing surface facing the side surface;

performing 6-axis alignment of the imaging device and the lens unit; and bonding the side surface of the substrate and the substrate-side-surface-facing surface to each other by irradiating the adhesive with light to cure the adhesive after the 6-axis alignment.

(11) The method of manufacturing a vehicle-mounted camera according to (10), in which the adhesive is a hybrid adhesive having thermosetting property in addition to the photo-curing property.

(12) The method of manufacturing a vehicle-mounted camera according to (10) or (11), in which the bonding is performed to correspond to an entire circumference of the substrate.

(13) The method of manufacturing a vehicle-mounted camera according to (10), in which the bonding is performed by first bonding using the adhesive having the photo-curing property or a hybrid adhesive having thermosetting property in addition to the photo-curing property, and second bonding using a thermosetting adhesive.

REFERENCE SIGNS LIST

2 vehicle-mounted camera
21 imaging device
**21*a*** imaging surface
22 substrate
**22*a*** imaging device mounting surface
**22*c*, 22*d*, 22*e*, 22*f*** side surface of substrate
23 lens unit
24 holder
25 bonding portion
**25*a*** adhesive
29 dust-proof cushion
41 through-hole
241 substrate bonding surface
**241*a*** substrate-side-surface-facing surface
**241*b*** bottom forming surface
242 holder holding portion
243 seating surface
251 first bonding portion
252 second bonding portion

The invention claimed is:

1. A vehicle-mounted camera, comprising:

a lens unit;

an imaging device configured to:

capture an image;

detect an object based on the captured image; and control a vehicle based on the detected object:

a substrate, wherein the imaging device is on the substrate, and the substrate has a plurality of side surfaces, wherein the plurality of side surfaces includes a first side surface, a second side surface, a third side surface, and a fourth side surface;

a holder configured to hold the lens unit;
a cavity; and
a bonding portion configured to bond the substrate with at least one surface of the holder, wherein
the at least one surface of the holder intersects with an imaging surface of the imaging device,
the bonding portion includes a first bonding portion and a second bonding portion,
the first bonding portion includes a first adhesive configured to bond the holder with end portions of each of the first side surface and the third side surface,
the second bonding portion includes a second adhesive configured to bond the holder with the second side surface and the fourth side surface,
the first side surface is opposite to the third side surface,
the second side surface is opposite to the fourth side surface,
a type of the first adhesive is different from a type of the second adhesive,
the holder includes a bottom forming surface, a substrate-side-surface-facing surface, and a seating surface,
the substrate-side-surface-facing surface faces the plurality of side surfaces of the substrate,
the substrate-side-surface-facing surface is inclined with respect to the plurality of side surfaces of the substrate,
the bottom forming surface is a bottom surface of the cavity,
the seating surface is configured to set a position of the substrate, and
a position of the bottom forming surface in an optical axis direction of the lens unit is different from a position of the seating surface in the optical axis direction.

2. The vehicle-mounted camera according to claim 1, wherein
the plurality of side surfaces of the substrate is perpendicular to the imaging surface, and
the bonding portion is further configured to bond the plurality of side surfaces of the substrate with the substrate-side-surface-facing surface.

3. The vehicle-mounted camera according to claim 2, wherein
the bottom forming surface is configured to stop, before a photo-curing process, the first adhesive between the plurality of side surfaces of the substrate and the substrate-side-surface-facing surface, and
the bonding portion is further configured to bond the plurality of side surfaces of the substrate to the substrate-side-surface-facing surface and the bottom forming surface.

4. The vehicle-mounted camera according to claim 3, wherein
the seating surface is further configured to receive a back surface of the substrate,
the back surface is opposite to a mounting surface of the substrate, and
the imaging device is mounted on the mounting surface of the substrate.

5. The vehicle-mounted camera according to claim 1, further comprising a dust-proof cushion, wherein
the substrate includes a mounting surface, and
the dust-proof cushion is between the holder and the mounting surface.

6. The vehicle-mounted camera according to claim 1, wherein
the first adhesive has a photo-curing property, and
the second adhesive has a thermosetting property.

7. The vehicle-mounted camera according to claim 1, wherein
the substrate further includes a through-hole with a filter function, and
the through-hole is configured to ventilate a space in a vicinity of the imaging surface.

8. A method of manufacturing a vehicle-mounted camera, comprising:
applying a first adhesive and a second adhesive between a plurality of side surfaces of a substrate and a substrate-side-surface-facing surface of a holder, wherein
an imaging device is mounted on the substrate,
the imaging device is configured to:
capture an image;
detect an object based on the captured image; and
control a vehicle based on the detected object,
the holder is configured to hold a lens unit,
the plurality of side surfaces includes a first side surface, a second side surface, a third side surface, and a fourth side surface,
the first adhesive is applied to bond the holder with end portions of each of the first side surface and the third side surface,
the second adhesive is applied to bond the holder with each of the second side surface and the fourth side surface,
the first side surface is opposite to the third side surface,
the second side surface is opposite to the fourth side surface,
a type of the first adhesive is different from a type of the second adhesive,
the substrate-side-surface-facing surface faces the plurality of side surfaces of the substrate,
the substrate-side-surface-facing surface is inclined with respect to the plurality of side surfaces of the substrate,
the holder further includes a bottom forming surface and a seating surface,
the bottom forming surface forms a bottom surface of a cavity,
the seating surface is configured to set a position of the substrate to form the cavity before alignment of the lens unit and an imaging surface of the imaging device, and
a position of the bottom forming surface in an optical axis direction of the lens unit is different from a position of the seating surface in the optical axis direction;
performing 6-axis alignment of the imaging device and the lens unit; and
bonding the plurality of side surfaces of the substrate with the substrate-side-surface-facing surface by irradiating the first adhesive with light to cure the first adhesive.

* * * * *